United States Patent
Duenas et al.

(10) Patent No.: US 11,076,157 B1
(45) Date of Patent: Jul. 27, 2021

(54) APPARATUS AND METHOD FOR RATE CONTROL IN ACCORDANCE WITH BLOCK AND STREAM ANALYSES

(71) Applicant: NGCodec Inc., Sunnyvale, CA (US)

(72) Inventors: Alberto Duenas, Mountain View, CA (US); Frank Bossen, Toronto (CA)

(73) Assignee: NGCodec Inc., San Jose, CA (US)

(*) Notice: Subject to any disclaimer, the term of this patent is extended or adjusted under 35 U.S.C. 154(b) by 58 days.

(21) Appl. No.: 15/586,064

(22) Filed: May 3, 2017

Related U.S. Application Data

(60) Provisional application No. 62/331,180, filed on May 3, 2016.

(51) Int. Cl.
| | |
|---|---|
| *H04N 19/146* | (2014.01) |
| *H04N 19/124* | (2014.01) |
| *H04N 19/42* | (2014.01) |
| *H04N 19/184* | (2014.01) |

(52) U.S. Cl.
CPC ......... *H04N 19/146* (2014.11); *H04N 19/124* (2014.11); *H04N 19/184* (2014.11); *H04N 19/42* (2014.11)

(58) Field of Classification Search
CPC ................. H04N 19/42; H04L 9/635
See application file for complete search history.

(56) References Cited

U.S. PATENT DOCUMENTS

| | | | | |
|---|---|---|---|---|
| 9,635,374 | B2* | 4/2017 | Zhou | H04N 19/42 |
| 9,918,079 | B2* | 3/2018 | Xi | H04N 19/44 |
| 2011/0274162 | A1* | 11/2011 | Zhou | H04N 19/117 |
| | | | | 375/240.03 |
| 2012/0195379 | A1* | 8/2012 | Alshin | H04N 19/105 |
| | | | | 375/240.12 |
| 2012/0307890 | A1* | 12/2012 | Lu | H04N 19/176 |
| | | | | 375/240.03 |
| 2014/0369621 | A1* | 12/2014 | Diggins | H04N 19/50 |
| | | | | 382/251 |
| 2016/0234506 | A1* | 8/2016 | Wang | H04N 19/152 |
| 2017/0006287 | A1* | 1/2017 | Subramanya | H04N 19/124 |

OTHER PUBLICATIONS

Xu et al. "A Fine Rate Control Algorithm with Adaptive Rounding Offsets (ARO)", IEEE Transactions on Circuits and Systems for Video Technology, vol. 19, No. 10, Oct. 2009. (Year: 2009).*

* cited by examiner

*Primary Examiner* — Brian T Pendleton
*Assistant Examiner* — Kyle M Lotfi
(74) *Attorney, Agent, or Firm* — Cooley LLP

(57) ABSTRACT

A hardware encoder has a block analyzer configured in hardware to selectively alter encoding parameters of a coding unit or a coding tree unit in response to encoder conditions and an analysis of the coding unit or coding tree unit. A stream analyzer operating as a software process on one or more computational cores selectively alters encoding parameters in response to evaluation of parameters associated with a stream of video data.

12 Claims, 3 Drawing Sheets

APPARATUS AND METHOD FOR RATE CONTROL IN ACCORDANCE WITH BLOCK AND STREAM ANALYSES

CROSS-REFERENCE TO RELATED APPLICATION

This application claims priority to U.S. Provisional Patent Application Ser. No. 62/331,180, filed May 3, 2016, the contents of which are incorporated herein by reference.

FIELD OF THE INVENTION

This invention relates generally to hardware based video signal processing. More particularly, this invention relates to techniques for rate control in accordance with hardware block analysis and software stream analysis.

BACKGROUND OF THE INVENTION

High Efficiency Video Coding (HEVC) is a video compression standard. In HEVC, the basic processing unit is called a coding tree unit (CTU) and it can be as large as 64×64 luma samples. A CTU can be split into multiple coding units (CU) in a quadtree fashion; these CUs can have sizes varying from 8×8 to 64×64. Each CU can be coded either as an intra-picture prediction (INTRA) CU or as an inter-picture prediction (INTER) CU. Thus, the CU is the basic unit for forming the prediction.

HEVC and previously Advanced Video Coding (AVC) define the maximum size that an encoder may use for the coding of a CTU (a macroblock in the case of AVC). The coding schema may produce an excessive bit count. In such cases, the raw uncompressed data may be used instead of the compressed data.

The HEVC specification constrains the maximum number of bits per CTU. It is possible that a CTU can be expanded by up to 7.4× in complex cases without this constrain. Although such an expansion is unlikely, an HEVC decoder should be able to accommodate it. Therefore, a constraint on the number of bits per CTU is introduced to reduce the burden on decoder implementations. HEVC allows for the size of a given CTU to be 5/3 of the uncompressed data.

It is important to avoid a situation in which one uses a very low quantization parameter (QP) to be able to deliver very high fidelity for a first image portion that is followed by a second image portion having a high entropy that is difficult to predict and that could therefore potentially lead to a number of bits for that CTU that is larger than the limits defined by HEVC.

Having to guarantee that the size of a CTU (or Macro Block (MB)) is a challenge that it is imposed on the encoder and leads to having to count the number of bits being used on the encoding process to avoid exceeding such a limit and break the constraints imposed by the standard. A rate control analysis is performed to evaluate the bit count to guarantee appropriate bit rate and transmission behavior. In many real time applications, especially those needing low delay, rate control parameters may need to be altered very quickly to respond to changing conditions of the incoming video. Nevertheless, the overall rate control needs to be accurate and needs to be subject to complex analyses that are not realistically performed in real time.

Accordingly, there is a need for improved rate control techniques.

SUMMARY OF THE INVENTION

A hardware encoder has a block analyzer configured in hardware to selectively alter encoding parameters of a coding unit or a coding tree unit in response to encoder conditions and an analysis of the coding unit or coding tree unit. A stream analyzer operating as a software process on one or more computational cores selectively alters encoding parameters in response to evaluation of parameters associated with a stream of video data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
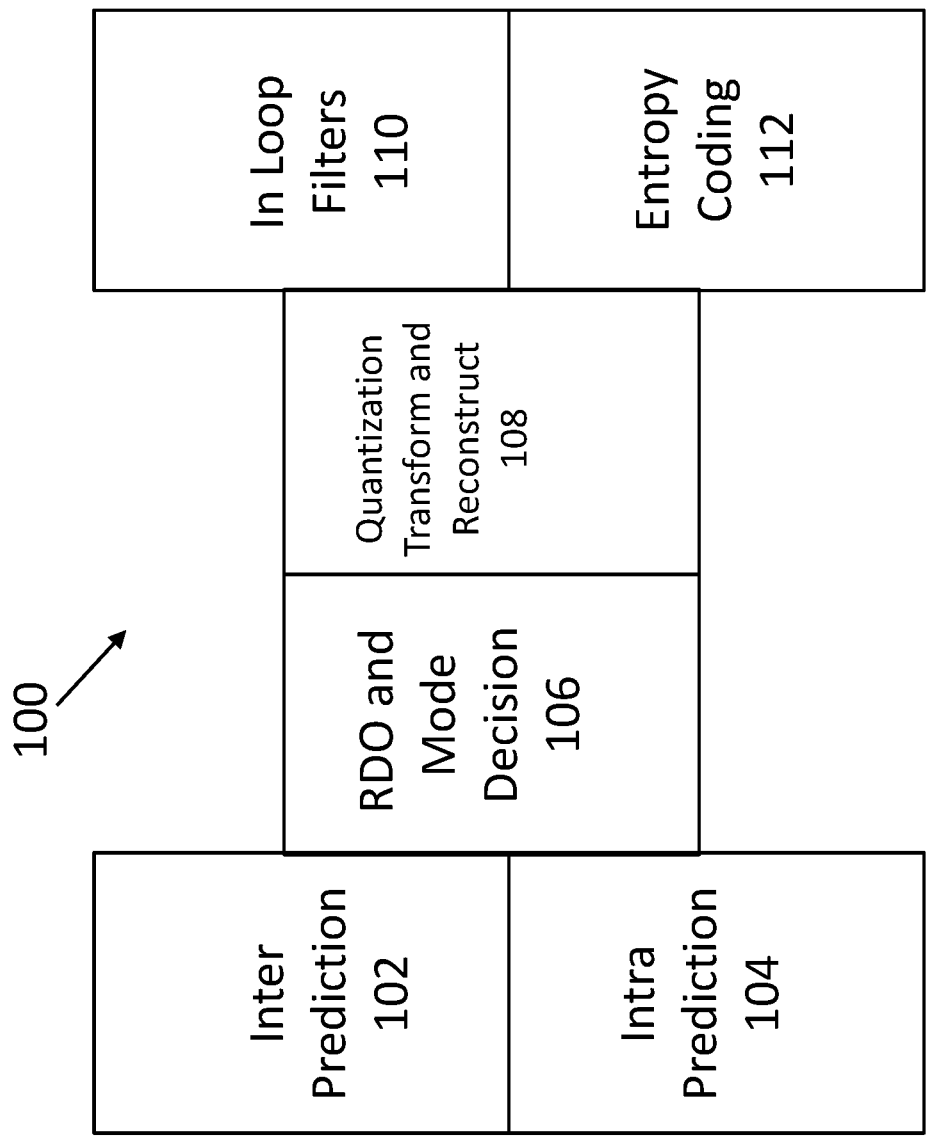
FIG. 1 illustrates generic stages of an encoder.

FIG. 1 illustrates an architecture 100 for an encoder. Inter prediction block 102 executes a prediction mechanism to predict the information of the current image from the information available from a future image and a past image. The intra prediction block 104 executes a prediction mechanism from the information available within a current image. Inter prediction block 102 and intra prediction block 104 are vertically aligned to denote that they may operate in parallel.

The Rate-Distortion Optimization (RDO) and mode decision block 106 selects a CTU candidate from all available CTU candidates. In particular, the encoder selects which way inter and intra predictions are combined and what block size to be used for the coding. Efficient encoders rely on rate-distortion metrics to make decisions, such as block size determination. Given a number of choices for a block size, an encoder estimates rate and distortion for each choice. The rate is generally expressed as a number of bits needed to encode the choice. The distortion can be expressed as a sum of squared differences between a block to be coded and its reconstructed version after compression. While it is possible to compute exact numbers when estimating rate and distortion, such an approach is impractical in most scenarios, in particular for real-time encoders. This impracticality stems from the high computational complexity required to compute the estimates. In practice, computationally efficient approximations are used. A rate estimate R and a distortion estimate D are typically combined into a single rate-distortion cost estimate C using a linear combination such as $\lambda R+D$ where $\lambda$, is a weighting factor called a Lagrange multiplier. This weighting factor reflects the desired balance between rate and distortion and may be adjusted according to a target bit rate. Once costs are determined for each of the choices available to the encoder, the one with the lowest cost is picked. This process is commonly referred to as rate-distortion optimization (RDO).

Block 108 performs Quantization, Transform and Reconstruct operations. The in loop filters block 110 reduce the distortion introduced by the encoding process. The entropy coding block 112 extracts the mathematical redundancy that may still exist in the data before it is transmitted to the decoder. Blocks 110 and 112 may perform operations in parallel.

The encoder 100 is based on a pipelined hardware design. Most of the processing of the video signals is performed by dedicated hardware blocks that are optimized for the associated task.

Each pipeline stage processes one complete CTU before sending it to the next pipeline stage. Pipeline stages that are vertically aligned are operating in parallel. Running at 200 MHz and utilizing each of the cores, about 6400 clock cycles are available for each pipeline stage when encoding an image of size 1920×1080. The signal processing pipeline stages are synchronous, each stage using the 6400 clock cycles to process the CTU, although for power saving purposes the stage may be largely shut down for many of those cycles, if the work on a given CTU is finished early.

Figure 2:
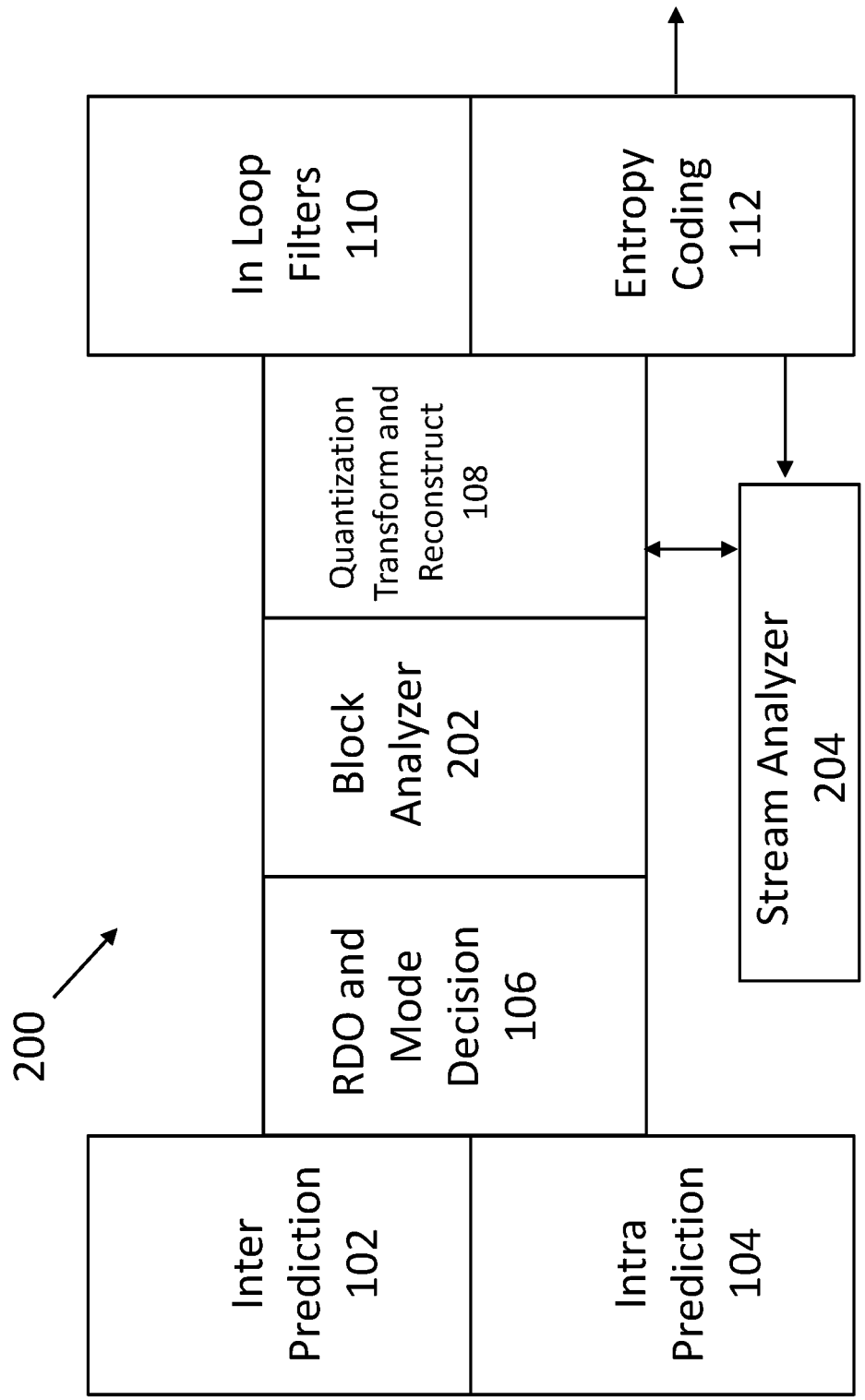
FIG. 2 illustrates an encoder configured in accordance with an embodiment of the invention.

FIG. 2 illustrates an encoder 200 configured in accordance with an embodiment of the invention. The encoder 200 includes the blocks of FIG. 1. In addition, the encoder includes a block analyzer block 202. The block analyzer block 202 is a hardware resource that is able to change encoding parameters at every block (e.g., CTU or CU) to react to potential rapid changes in the image. Thus, it is a fast resource.

FIG. 2 also includes a stream analyzer 204. The stream analyzer 204 is software process operating on one or more computation cores. The stream analyzer 204 is a flexible, but relatively slow resource. The stream analyzer 204 processes entropy coding data to evaluate a stream comprising multiple CTUs or CUs. The stream analyzer 204 employs sophisticated analyses that take into account a large number of inputs and parameters. The stream analyzer 204 provides encoding parameters that are periodically supplied to the quantization transform and reconstruct block 108. Encoding parameters may include one or more quantization parameters (QP) and one or more rounding offsets that are used in the quantization process to determine whether individual transform coefficients should be rounded up or down.

Figure 3:
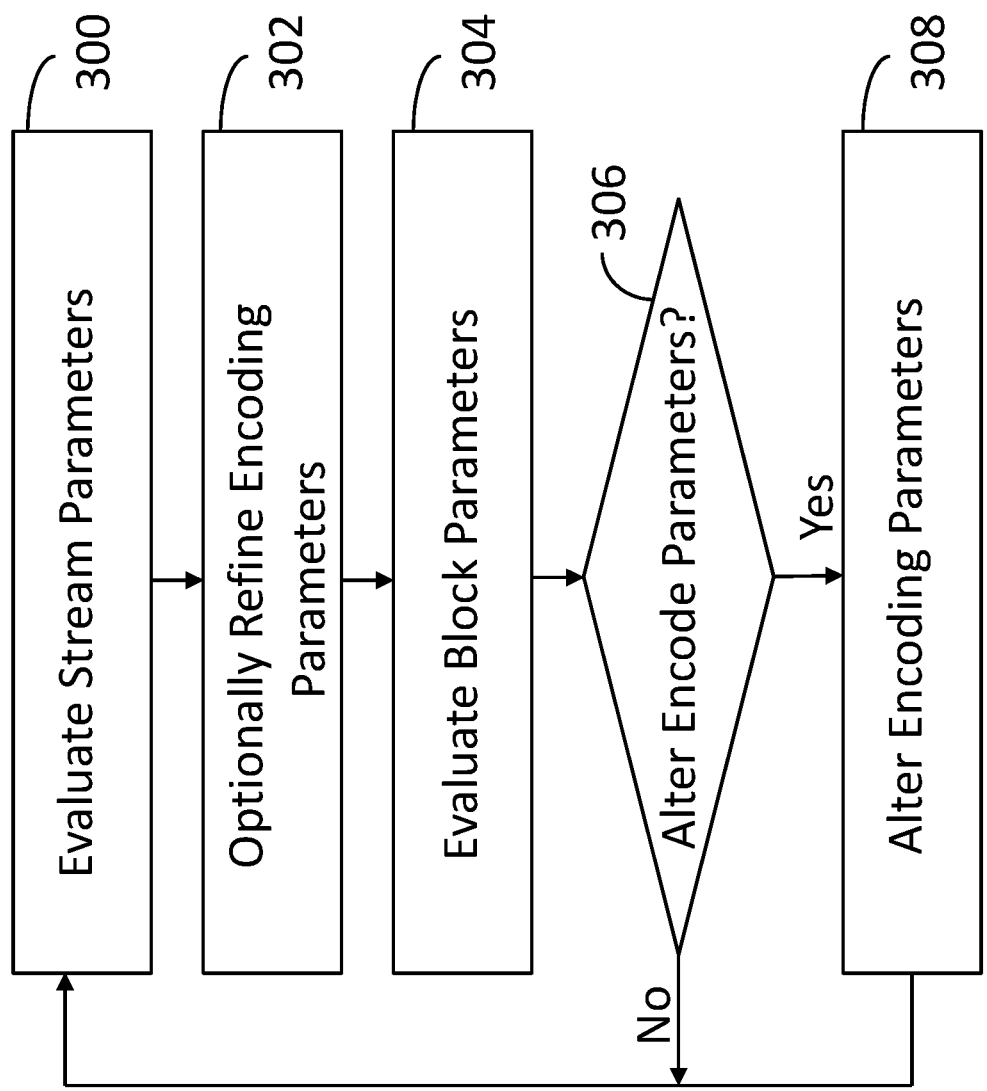
FIG. 3 illustrates processing operations associated with an embodiment of the invention.

FIG. 3 illustrates processing operations associated with an embodiment of the invention. In particular, FIG. 3 illustrates CTU and CU processing operations. Stream parameters are analyzed 300. This may be performed by the stream analyzer 204. The analysis results in optional refinement of encoding parameters 302. The new encoding parameters are applied to the quantization transform and reconstruct block 108.

Next, block parameters are evaluated 304. This operation is implemented with the block analyzer 202. If encoding parameters do not need to be changed (306—No), control returns to block 300. If encoding parameters do need to be changed (306—Yes), the parameters are altered 308 and control returns to block 300.

A CTU level analysis determines the average quantization parameter for the coding of the next CTU. The stream analyzer 204 executes a slow process mostly, if not exclusively, in software. This process is thorough and accurate. The block analyzer 202 operates in hardware. The block analyzer 202 alters quantization parameters based upon a number of considerations. First, the quantization parameters may be altered because the estimated size in bits of a CTU exceeds a threshold (e.g., 5/3 the size of the raw data). Such an estimated size in bits may be provided by block 108 to the block analyzer 202. If the estimated size in bits of a CTU exceeds such a threshold, a quantization parameter is increased. The amount by which it is increased may depend on the amount the estimated size in bits exceeds the threshold. For example, the quantization parameter may be increased by one for each time the estimate size in bits of a CTU exceeds the threshold by 12%. Second, the CTU may use a very large number of bits proportionately to the allocated size of a frame. If the estimated size in bits of a CTU exceeds an average number of bits for a CTU, a quantization parameter is increased. Third, the CTU may make the encoder output exceed buffer limits. If the buffer limits are exceeded, a quantization parameter is increased. Alternatively, the skip mode may be used such as to limit the number of bits being produced by entropy coding 112. Finally, a given CTU may be larger than the size allocated for a slice or minimum decodable unit. In the case where the slice size is determined in bytes, only one CTU may actually be larger than the allocated size of that slice, in which case the size of the CTU should be limited. Such a limitation is achieved by increasing a quantizer parameter value.

The block analyzer 202 may also employ a skip enforcing mechanism to limit the size of the CTU when buffering limits are approaching and increasing the quantization parameters is not reducing the bit rate fast enough. The block analyzer 202 may also zero coefficients to limit the size of intra-CTUs in the event that buffering limits are approaching and increasing the quantization parameters is not reducing the bit rate fast enough.

A CU level analysis determines the quantization parameters to be used for coding the current CU of the image. The goal is to avoid using a large number of bits in cases where there is an ultra-low delay requirement and there is a change in the complexity inside the picture. Quantization parameters may also be altered because a CU uses a very large number proportionately to the allocated size of a frame. Quantization parameters may also be altered when a CU may make the encoder output exceed a buffer limit. The block analyzer 202 may use the information coming from the analysis of the current CU to decide on the complexity of the CU to be encoded and decide quantization parameters to be used for the CU. In one embodiment, there is a steady state CU mode and change of CU complexity mode. In the steady state mode, the block analyzer 202 meets the target number of bits that is provided by the CTU level. In the change of CU complexity mode, the block analyzer 202 detects the change of complexity that will lead to a change in the number of bits used if the previously computed quantization parameter would be used and it uses a larger quantization parameter that will endeavor to minimize the number of bits used for the following CUs. Based on the extra complexity of the image, a decision is made about how many extra bits are needed to encode the CU. The block analyzer 202 performs these operations.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A hardware encoder, comprising:
a pipelined hardware design, including:
a block analyzer configured in hardware to selectively alter encoding parameters of every coding unit or coding tree unit in response to encoder conditions and an analysis of the coding unit or coding tree unit;
a quantization transform and reconstruction block after the block analyzer in the pipelined hardware design;
an entropy coding block after the quantization transform and reconstruction block in the pipelined hardware design; and
a stream analyzer simultaneously operative with the block analyzer operating as a software process on one or more computational cores to selectively alter encoding parameters, including quantization parameters and rounding offsets used in quantization in the quantization transform and reconstruction block in response to evaluation of a plurality of parameters received in a feedback loop from the entropy coding block, the entropy coding block supplying the plurality of parameters that are associated with a stream of video data comprising multiple coding units or coding tree units, the stream analyzer communicating solely with the entropy coding block and the quantization transform and reconstruction block.

2. The hardware encoder of claim 1 wherein the encoder conditions include a buffering limit.

3. The hardware encoder of claim 1 wherein the analysis of the coding unit or coding tree unit includes detecting a change of complexity.

4. The hardware encoder of claim 3 wherein larger quantization parameters are used in response to detecting the change of complexity.

5. The hardware encoder of claim 1 wherein the encoding parameters of the coding unit or the coding tree unit are altered in response to the coding unit or coding tree unit exceeding a size threshold.

6. The hardware encoder of claim 5 wherein the size threshold is an average number of bits for the coding unit or coding tree unit.

7. The hardware encoder of claim 5 configured to increase a quantization parameter in response to exceeding the size threshold.

8. The hardware encoder of claim 1 wherein the encoding parameters of the coding unit or the coding tree unit are altered in response to the coding unit or coding tree unit using a disproportionate number of bits for an allocated frame size.

9. The hardware encoder of claim 1 wherein the encoding parameters of the coding unit or the coding tree unit are altered in response to the coding unit or coding tree unit exceeding a buffer limit.

10. The hardware encoder of claim 9 configured to increase a quantization parameter in response to exceeding the buffer limit.

11. The hardware encoder of claim 9 configured to invoke a skip mode in response to exceeding the buffer limit.

12. The hardware encoder of claim 1 wherein the encoding parameters of the coding unit or the coding tree unit are altered in response to the coding unit or coding tree unit exceeding the size allocated for a minimum decodable unit.

* * * * *